United States Patent
Bonner, Jr.

[15] 3,666,728
[45] May 30, 1972

[54] POLYTHIOUREAS AND SHAPED ARTICLES THEREOF

[72] Inventor: Willard Hallam Bonner, Jr., Wilmington, Del.

[73] Assignee: E. I. du Pont de Nemours and Company, Wilmington, Del.

[22] Filed: Oct. 27, 1969

[21] Appl. No.: 869,870

[52] U.S. Cl. ............... 260/77.5 CH, 260/30.2, 260/30.8 DS, 260/32.6 N, 260/77.5 C, 260/79, 264/184, 264/205
[51] Int. Cl. .................................................. C08g 22/02
[58] Field of Search .................... 260/77.5 CH, 79, 77.5 C

[56] References Cited

UNITED STATES PATENTS

| | | | |
|---|---|---|---|
| 2,284,896 | 6/1942 | Hanford et al. | 260/2 |
| 2,888,438 | 5/1959 | Katz | 260/77.5 |
| 2,313,871 | 3/1943 | Hanford et al. | 260/2 |

FOREIGN PATENTS OR APPLICATIONS 1,039,371 8/1966 Great Britain ................... 260/77.5

Primary Examiner—Donald E. Czaja
Assistant Examiner—M. I. Marquis
Attorney—Eugene Berman

[57] ABSTRACT

Homo- and co-polythioureas having recurring units of the formula:

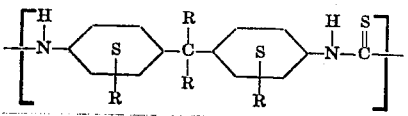

wherein R is hydrogen or methyl, are useful in the preparation of shaped articles (particularly fibers).

7 Claims, No Drawings

POLYTHIOUREAS AND SHAPED ARTICLES THEREOF

This invention relates to novel high-molecular weight polythioureas and shaped articles thereof having properties superior to those of known polythioureas.

BACKGROUND OF THE INVENTION

Polythioureas are known polymeric materials from which the preparation of shaped articles is suggested in, e.g. U.S. Pat. No. 2,313,871. However, the properties of known polythioureas are not entirely suitable for many end-uses.

SUMMARY OF THE INVENTION

This invention provides linear, high-molecular polythioureas wherein at least 35 mole percent of the repeating units are of the formula:

(I)
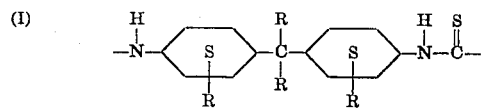

wherein each R is individually hydrogen or methyl, the hexagon,

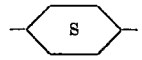

represents a cyclohexylene radical. Suitable copolymeric repeating units, when present, being divalent organic radicals containing four to 20 carbon atoms per recurring unit and being joined into the linear polymer chain, as an integral part thereof, by thiourea

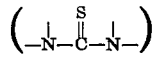

linkages. By "divalent organic radicals" is meant divalent radicals which are predominantly alicyclic and/or aliphatic hydrocarbon which may have substituents for hydrogen (e.g., halogen). The polythioureas of this invention exhibit suitably high molecular weights as evidenced by inherent viscosities of at least about 0.25, preferably at least about 0.5, as measured by procedures subsequently described herein.

Shaped articles prepared from the above-described polythioureas, such as films, strong fibers, and fabrics, are also comprehended by this invention. In particular, fibers of the above-described polythioureas are characterized by a desirable combination of properties not obtained in known polythioureas.

DESCRIPTION OF THE PREFERRED EMBODIMENTS

Homo- and Co-polythioureas

The novel polythioureas of this invention can be prepared by solution polymerization techniques wherein diamines hereinafter called "G-PACM," represented by the formula:

(II)
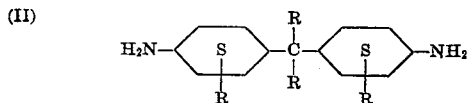

wherein R is hydrogen or methyl alone or together with other suitable diamines hereinafter described, are caused to react with one or more reactants, described hereinafter, capable of providing the thiocarbonyl portion of the thiourea linkage. The preferred diamine is bis(p-aminocyclohexyl)-methane, hereinafter called "PACM." Among the other suitable G-PACM diamines may be named bis(2-methyl-4-aminocyclohexyl)-methane and bis(p-aminocyclohexyl)propane G-PACM, due to its carbocyclic nature, is a mixture of isomers having trans-trans (tt), cis-trans (ct), and cis-cis (cc) configurations. Hydrogenation conditions used to prepare G-PACM produce a mixture of isomers. For example, different hydrogenation conditions produce different isomer distribution in PACM, as shown in U.S. Pat. No. 2,494,563 and U.S. Pat. No. 2,606,924. In the present invention it is preferred that the G-PACM reactant be comprised of at least about 30 percent (more preferably at least about 55 percent) by weight of the trans-trans (tt) isomer. Correspondingly, the polymer produced therefrom would have essentially the same weight percentage of the diimino hydrocarbon moiety (i.e.,

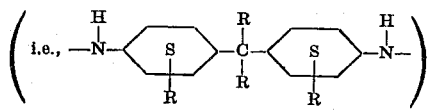

of formula (I) in the (tt) stereoisomeric configuration.

Other suitable diamines as referred to above, are of the primary and secondary diamines of the formula:

(III)
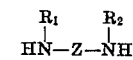

wherein Z is a divalent organic radical as defined above, and $R_1$ and $R_2$ are individually selected from hydrogen and lower alkyl (1-3 carbon).

Preferred diamines useful in the preparation of copolythioureas of this invention include tetramethylene diamine; pentamethylene diamine; hexamethylene diamine; 1,4-diaminocyclohexane; and perhydrobenzidine.

Among the suitable thiocarbonyl-providing reactants, carbon disulfide ($CS_2$) is most preferred. The $CS_2$ process is suitable for all of the primary diamines, described above; when secondary diamines are utilized, other thiocarbonyl-providing reactants (described hereinafter) are utilized.

Other suitable thiocarbonyl-providing materials are bis(p-isothiocyanato) reactants of the formula (IV)    $S=C=N—Z—N=C=S$ wherein Z is a divalent organic radical as defined above. Useful formula (IV) reactants include the bis(p-isothiocyanato) derivatives of the primary diamines of the formula (II) above. The preferred formula (IV) reactant is bis(p-isothiocyanatocyclohexyl) methane

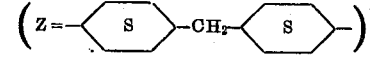

whose preparation is described in U.S. Pat. No. 2,551,378. This reactant, similar to PACM, also exists as a mixture of isomers. In this invention, it is preferably, but not necessarily, used in the same isomeric distribution as the G-PACM with which it is reacted. The generic class of preferred formula (IV) reactants is characterized by

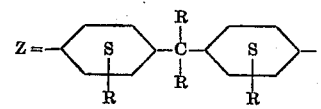

wherein R is hydrogen or methyl.

As noted above, the polythiourea of this invention contains at least 35 mole percent of the repeating units of formula (I) above. When the diamine reactant is PACM and is reacted with $CS_2$ and/or bis(p-isothiocyanatocyclohexyl)methane the preferred homopolythiourea of this invention is obtained (i.e., consisting essentially of repeating units of formula (I), above, wherein R is hydrogen). When other G-PACM diamines (in addition to or in lieu of PACM) and/or other preferred bis(p-isothiocyanato) reactant [in addition to or in lieu of bis(p- isothiocyanatocyclohexyl)methane] are used, other preferred polythioureas of this invention, consisting essentially of at least one type of repeating unit of formula (I), are obtained. Suitable proportions of other suitable diamine reactants, such as those of formula (III) (in addition to or in lieu of G-PACM) and/or other suitable formula (IV) bis(p-isothioycanato) reactants [in addition to or in lieu of the $CS_2$ and/or the preferred bis(p-isothiocyanato) reactants] can be used to obtain a copolythiourea of this invention (i.e., at least about 35 mole percent of repeating units of formula (I), above).

Preferably, at least about 75 mole percent of the repeating units of the polythioureas of this invention are of formula (I), above. Polythioureas consisting essentially (i.e., about 90–100 mole percent) of formula (I) repeating units are most preferred. Preferred copolymeric recurring units are of the formula:

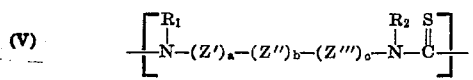

wherein:

Z', Z'', and Z''' are individually selected from the group consisting of: divalent alicyclic hydrocarbyl radicals of six carbon atoms which may bear up to 2 chloro and/or methyl substituents per ring, and divalent saturated aliphatic hydrocarbyl radicals of one to six carbon atoms which may bear chloro substituents, a, b, and c (which may be the same or different) are 0 to 1, at least one of said integer being 1, and $R_1$ and $R_2$ are individually selected from the group consisting of hydrogen and lower alkyl (one to three carbon atoms), with the provision that $-(Z')_a-(Z'')_b-(Z''')_c-$ contain four to 20 carbon atoms.

The most referred copolymeric recurring units contain organic radicals. As used herein the term "copolymer" includes polymer containing one or more suitable types of recurring units. For example, terpolymers of formula (I) and formula (V) recurring units are contemplated herein.

POLYMERIZATION CONDITIONS

The formula (I) thiourea polymer is conveniently prepared by reacting G-PACM and carbon disulfide. The reaction is preferably carried out, e.g., under nitrogen, in a solvent such as N,N-dimethylacetamide; pyridine; N-methylpyrrolidone-2; N,N-dimethylformamide; hexamethylphosphoramide; dimethylsulfoxide; or suitable mixtures thereof. The polymerization reaction is preferably carried out between about 100°–150° C., from about 0.5 – 24 hr. The G-PACM and carbon disulfide reactants can be employed in approximately equimolar quantities or the carbon disulfide can be used in excess amounts, e.g., up to 100 percent excess or higher. Although the $CS_2$ reaction may be carried out using other reaction media (e.g., toluene), the solvents listed above are preferred because shorter reaction times can be used without sacrificing molecular weight or the polymer properties in shaped articles.

The polymer can be precipitated by combining the reaction mixture with a non-solvent (e.g., water, methanol), after which the product is collected, washed, and dried prior to subsequent processing. If desired, certain reaction mixtures, i.e., those from which the polymer had not precipitated, can be used directly for the preparation of shaped articles. For such a use, it is preferred that the heated reaction mixture be permitted to cool to room temperature, after which a quantity of a salt selected from the group LiCl and $CaCl_2$, from 1 to 8 percent by weight (based on the total weight of all ingredients) is added. Since the percent polymer soluble in solution varies with the solvent employed, the percent salt present also varies from solvent to solvent. For example, less LiCl is preferred in hexamethylphosphoramide than in N-methylpyrrolidone-2, or N,N-dimethylacetamide. The combined ingredients are then stirred at room temperature, e.g., for up to 0.5 hour or longer, to form a stable solution suitable for, e.g., spinning.

The formula (I) thiourea polymer is also conveniently prepared by causing equimolar quantities of G-PACM and bis(p-isothiocyanatocyclohexyl)methane or other preferred bis(p-isothiocyanato) reactants to react in a solvent, e.g., N,N-dimethylacetamide; pyridine; N-methylpyrrolidone-2; N,N-dimethylformamide; hexamethylphosphoramide; or mixtures thereof, at ambient temperatures, for period up to about 72 hours, preferably 15–20 hours. Preferably the reaction is carried out in an inert atmosphere, e.g., under nitrogen. The polymer may be isolated as described above. If it is desired to prepare shaped articles directly from the reaction mixture, without isolation of the polymer, the addition of a salt such as LiCl assists in maintaining a fluid reaction mixture. The LiCl may be present in amounts of 1 to 8 percent, preferably 1.5 to 3 percent, based upon the total weight of all ingredients in the reaction mixture and may be added shortly after the onset of the reaction. The presence of the salt also assists in obtaining clear, bright, wet-spun fibers.

The polythiourea consisting essentially of recurring units of formula (I) preferably exhibits an inherent viscosity of at least about 0.5 (measured by the techniques described hereinafter) when used for preparation of the fibers of this invention. Films can be prepared from polymer of inherent viscosity of at least about 0.25.

The polythioureas of this invention which contain recurring units other than of formula (I) are prepared by the procedures described above. A portion of the G-PACM or of the preferred bis(p-isothiocyanato) reactants is replaced by one or more suitably diamines, as described above, or by one or more of the other suitable bis(isothiocyanato) reactants as described above, as appropriate. Preferably, the copolymers of this invention exhibit an inherent viscosity of at least about 0.5 in m-cresol as measured by procedures described hereinafter.

SHAPED ARTICLE PREPARATION

The homo- and co-polythioureas of this invention which are isolated in bulk form can be converted into shaped articles by first incorporating them into solutions or dopes which are then extruded into fibers, (mono- or multi-component), cast into films, formed into fibrids, etc. The solid homo- or co-polythiourea is redissolved at room temperature in a solvent or mixture of solvents selected from the group of N,N-dimethyl-acetamide; N-methylpyrrolidone-2; hexamethylphosphoramide; and N,N-dimethylformamide to which is preferably added LiCl or $CaCl_2$. The solutions can contain from about 2 to about 25 weight percent of the polymer of copolymer, from about 1.5 to about 10 weight percent of LiCl (when $CaCl_2$ is employed, about 4 to about 6 weight percent is preferred), and the balance is one or more of the appropriate solvents previously noted.

Fibers, films, and other shaped articles are directly prepared, also, from the previously described reaction mixtures wherein the polymeric products are not isolated. For such preparations, the procedures described below are applicable.

The novel fibers of this invention can be prepared by extruding the above-described solutions via conventional wet- and dry-spinning techniques. In wet spinning, which is preferred, an appropriately prepared solution, whose temperature can vary from about 10° to 100° C., is extruded into a suitable coagulating bath, e.g., a water bath maintained between about 5° to 85° C. When spinning hexamethylphosphoramide solutions, water/hexamethylphosphoramide mixtures (e.g., 75/25, V/V) may be used as baths. Similarly, bath mixtures of water/N,N-dimethylacetamide (e.g., 25/75, V/V) can be used when extruding N,N-dimethylacetamide solutions. The temperature of the bath and the LiCl content of the spinning solution affect the cross-sectional shape of the fiber obtained. For example, when a N-methylpyrrolidone-2 solution of poly(4,4'-methylenedicyclohexylene)thiourea is extruded into a water bath at 5° C., round filaments are obtained; dog-bone shaped filaments result when the water bath is at 70° C. Use of solutions with higher LiCl content, and baths of lower temperature, favor the production of round filaments from both hexamethylphosphoramide and N,N-dimethylacetamide spinning solutions. Dry spinning may be accomplished by extruding a spinning solution into a heated current of gas whereby solvent evaporation occurs and filaments are formed.

After being formed, the fibers of this invention can be treated with a finish composition and wound up on bobbins. Residual solvent and salt can be removed by soaking the bobbins, e.g., in water or methanol, after which the fibers are dried. Removal of the salt and solvent can also be accomplished by passing the fiber through aqueous baths prior to wind up, by flushing the bobbins with water during wind up, etc.

The solutions comprising the homo- and co-polythioureas of this invention can be formed into strong self-supporting films by conventional wet extrusion methods. The solutions can also be used to prepare fibrids, useful for paper preparation, via the precipitation procedures described in Morgan U.S. Pat. No. 2,999,788.

It will be understood that the usual additives such as dyes, fillers, antioxidants, etc., can be incorporated in with the homo- and co-polythioureas for the purposes intended prior to shaped article preparation.

FIBERS: PROPERTIES AND PROCESSING; FABRICS

The novel fibers of this invention are prepared from the above polymers and copolymers by both wet and dry spinning techniques as exemplified hereinafter. Although these as-spun fibers have properties suitable for many end-uses, the tensile and other properties thereof are preferably enhanced by subjecting them to a post-extrusion hot drawing treatment (i.e., the heat treatment described hereinafter). These heat treated fibers exhibit a desirable combination of properties including: high tensile properties (initial modulus and tenacity) and high recovery (tensile and work recovery), both at room temperature and at elevated temperatures, under wet or dry conditions. In addition, the fibers exhibit a high washset recovery angle, excellent stability against degradation and loss of properties caused by UV light, oxidative bleach treatments, exposure to high temperatures and high humidity. This desirable combination of properties which characterizes the polythioureas of this invention, is not obtained in known polythioureas.

Although each of the above properties are considered desirable, some of these properties are most significant in fabric end-uses. For example, the wash-set recovery angle (WSRA) of a fiber indicates its wash-wear potential; fibers of this invention exhibit excellent wash-wear properties and are characterized by WSRA values in excess of about 300°. The work recovery (WR$_3$) of a fiber characterizes its wrinkle resistance; fibers of this invention exhibit WR$_3$ values greater than about 50 percent at room temperature. Similarly, fibers of this invention exhibit tensile recover (TR$_3$) values greater than about 80 percent at room temperature. The room temperature tensile properties (tenacity and initial modulus) of the fibers of this invention are highly desirably, being generally in excess of about 2 gpd and 30 gpd, respectively. The fibers of this invention are particularly outstanding in their retention of properties at elevated temperatures (100°–160° C.). At 160° C., for example, they generally retain about 80 percent of their room temperature tenacity and modulus and essentially all of their work and tensile recovery values. The hot-wet modulus is of particular importance in that it is an indication of how fibers will act in the dye bath under conditions of tension which are normally used in the dyeing of fabrics (e.g., a very low hotwet modulus indicates that the fiber will stretch out of shape and will also wrinkle during dyeing operations). Fibers of this invention exhibit suitable high hot-wet moduli, generally in excess of about 30 gpd at 90° C.

The above referred to properties characterize the heat treated fibers prepared from the formula (I) polythioureas of this invention. The introduction of copolymeric units to the extent and of the type indicated above generally does not substantially decrease the desirable properties of the homopolymer consisting essentially of repeating units of formula (I). To retain these desirable properties to the highest extent, it is preferred that greater than about 75 mole percent of the repeating units in the polymer chain be of formula (I) and/or that the divalent organic radicals in any copolymeric units, which are not of formula (I), be predominantly alicyclic (e.g., cyclohexylene).

As mentioned above, the fibers of this invention are preferably subjected to a post-extrusion hot drawing treatment; this heat treatment can be carried out in steam or in an otherwise-heated atmosphere (e.g., hot ovens, tubes, furnaces, etc.), or by use of hot plates, bars, shoes, or other suitable devices. Preferably, steam drawing is performed at a pressure of 5–50 lb/in.$^2$ (0.35–3.50 kg./cm.$^2$) with a draw ratio of 1.1–1.7X. Drawing in heated ovens, tubes, furnaces, etc., or over hot plates, bars, shoes, and the like is performed at 200° to 315° C., preferably 230° to 290° C., at a draw ratio of 1.1 to 2.0X. Residence or contact time of the fiber in or on the heated medium is from 2 to 30 secs., preferably from 10 to 20 secs.

Fibers of this invention may be further processed in a conventional manner, for example, they may be crimped (e.g., by gear crimping methods), cut into staple lengths and spun into yarns and the like.

The preferred end-use for the polythioureas of this invention is in fabrics thereof. Fabrics prepared from fibers of this invention are found to return closely to their original smooth or surface textured appearance after repeated home launderings, a very desirable property for wash-wear fabrics.

The excellent wash-wear potential of the fabrics is indicated by fiber wash-set recovery angle data referred to above, and confirmed by actual fiber testing. Further evidence of the suitability of fibers of this invention for use in ease of care fabrics are the suitably high hot-wet modulus values exhibited by these fibers referred to above.

MEASUREMENTS AND TESTS

Inherent Viscosity: Inherent viscosity ($\eta$inh) is defined by the following equation:

$$\eta\text{inh} = \ln (\eta\text{rel})/C$$

wherein ($\eta$rel) represents the relative viscosity and C represents a concentration of 0.5 gram of the polymer in 100 ml. of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30° C., using m-cresol ("I") or N,N-dimethylacetamide/LiCl (95/5 wt./wt.) ("II"), unless otherwise specified. Values determined in "II" are usually about 1.5X those determined in "I."

Fiber Tensile Properties: Fiber properties of tenacity, elongation, and initial modulus are coded as T/E/Mi and are reported in their conventional units, i.e., grams per denier, percent, and grams per denier. Denier is coded as Den. Such properties are conveniently measured on equipment as specified in ASTM specification D76–53, (Oct., 1962), utilizing a testing machine, e.g., an Instron tester (product of the Instron Engineering Corp., Canton, Mass.), providing a constant rate of extension. Unless otherwise specified, samples having a break elongation of up to about 8 percent are tested at a rate of extension of 10%/minute; samples of higher break elongation are tested at 60%/minute. Samples are filaments which measure 1 inch (2.54 cm.) in length or yarns having 3 turns/inch which measure 10 inches (25.4 cm.) in length; and testing is done at 21° C. and 65% R.H., unless otherwise specified.

If samples are not boiled off (scoured), they are generally conditioned at 21° C. and 65% R.H. for at least 16 hours unless otherwise specified. If boil-off is specified, it consists of boiling the filaments or yarns for 30 minutes in 0.1 percent aqueous sodium lauryl sulfate, rinsing, drying at 40° C. for 1 hr. and conditioning at 21° C. and 65% R.H. for at least 16 hours, unless otherwise specified.

Work Recovery and Tensile Recovery: The terms work recovery and tensile recovery, coded as WR and TR, are reported in percent. These terms are used as defined in R. G. Beaman and F. B. Cramer, J. Poly. Sci., Vol. 21, 228 (1956). The subscripts on WR and TR refer to the percent elongation (e.g., 3 percent).

Wash-Set Recovery Angle (WSRA): The wash-set recovery angles of fibers of this invention are determined by the procedures shown in Gadecki et al. U.S. Pat. No. 3,249,591.

Light Stability: For purposes of testing the light durability and discoloration of shaped articles of this invention, samples of fibers and/or films were exposed to light from a Xenon lamp in a Model 600-WR Weather-Ometer, a product of the Atlas Electric Devices Co., Inc., Chicago, Illinois. The apparatus was operated according to the American Association of Textile Chemists and Colorists (AATCC) procedure number 16E-1964T.

Home Laundering Evaluation: The appearance of fabrics (prepared from fibers of this invention) after home laundering is determined by the laundering and evaluation procedures shown in Gadecki et al. U.S. Pat. No. 3,249,591 and are referred to therein as a "C" wash.

Tensile Strain Recovery (TSR): TSR values are determined as described in Gadecki et al. U.S. Pat. No. 3,249,591 and are useful in predicting wash performance. The subscripts on TSR refer to the percent elongation (e.g., 3 percent).

EXAMPLE 1

This example illustrates the preparation of poly-(4,4'-methylenedicyclohexylenethiourea) by the reaction between PACM (94% tt) and di(4-isothiocyanatocyclohexyl) methane in an amide medium. Fibers exhibiting high initial modulus and high recovery are prepared.

To a stirred solution of PACM (27.4 g., 0.13 mole, 94% tt) in 300 ml. of N,N-dimethylacetamide is added di(4-isothiocyanatocyclohexyl)methane (38.8 g., 0.13 mole, 94% tt). A clear solution results in 2 minutes; a solution of 11.0 g. of LiCl in 100 ml. of N,N-dimethylacetamide is added, and the reaction mixture temperature rises to 50° C. The reaction mixture is stirred overnight at ambient temperature to produce a viscous solution containing 13.7 percent polymer (by weight) and 2.3% LiCl (by weight). A sample of the polymer isolated from solution exhibits an inherent viscosity of 0.94 (I).

The reaction mixture is then extruded through a spinneret having 100 holes of 0.003 in. (0.0076 cm.) diameter, each, into a water bath at 70° C. The resultant yarn is wound up at 35 ft./min. (10.65 m./min.) and is extracted in water for one week, after which it is dried in a nitrogen atmosphere. The yarn is then drawn 1.4X at 230° C. The filaments exhibit the following properties: T/E/Mi/Den.: 2.4/17/50/10.6; $WR_3$ and $TR_3$ are 60 and 84, respectively.

A similar synthesis provided a much more viscous reaction mixture which is diluted with additional N,N-dimethylacetamide to form a spinning solution containing 6.9 percent polymer (by weight) and 1.15% LiCl (by weight); $\eta$inh = 1.4 (I). This solution is wet spun and the resultant yarn extracted overnight with water. After the yarn is drawn 1.4X at 290° C., the following filament properties are exhibited: T/E/Mi/Den.: 4.4/6.0/88/3.1. Another sample of yarn which is drawn 1.35X at 300° C. has the following properties after boil-off: T/E/Mi/Den.: 6.9/8.4/76/3.1; $WR_3/TR_3/TSR_3$: 82/94/76.

EXAMPLE 2

This example illustrates the preparation of poly-(4,4'-methylenedicyclohexylenethiourea) by the reaction between PACM (70% tt) and di(4-isothioycanatocyclohexyl)methane (70% tt). Fiber and fabric preparation are also shown.

To a stirred solution of PACM (170 g., 0.8 mole, 70% tt) in 4,600 ml. of N,N-dimethylacetamide is added, under nitrogen, di(4-isothiocyanatocyclohexyl)methane (238 g., 0.73 mole, 70% tt). Complete solution occurs within a few minutes and the temperature of the reaction mixture rises to 50° C. After 5 minutes, an 8 percent solution of LiCl in N,N-dimethylacetamide (800 ml.) is added. The reaction mixture is allowed to polymerize overnight at ambient temperature. The reaction mixture contains 7 percent by weight polymer and 1.1 percent by weight LiCl.

The viscous, clear reaction mixture is extruded into a 60° C. water bath through a 40-hole spinneret. As-extruded properties of filaments are: T/E/Mi/Den.: 1.7/56/32/3.1 (boiled-off filaments); $WR_3/TR_3 = 55/78$.

The above-described yarn ($\eta$inh = 1.2) (I) is drawn 1.3X at 230° C. through a hot tube (length = 5 ft. or 1.5 m.) under hot nitrogen. Filament properties exhibited after relaxed boil-off of the yarn are: T/E/Mi/Den.: 2.3/20/48/2.2; $WR_3/TR_3$ 32 67/89 (boiled off).

A plain weave fabric is prepared from the above filaments.

EXAMPLE 3

This example illustrates the preparation of poly-(4,4'-methylenedicyclohexylenethiourea) utilizing $CS_2$ as the thiocarbonyl-providing reactant in pyridine; fiber preparation by wet spinning is also shown.

To a solution of PACM (21.0 g., 0.10 mole, 70% t,t) 1.0 g. of sulfur and 6 g. of lithium chloride in 200 ml. of pyridine is slowly added 12 ml. (15.1 g.) of carbon disulfide; the mixture is stirred overnight at room temperature, during which time little reaction apparently occurs. The mixture is then heated to 120° C. for about 2 hours during which time hydrogen sulfide evolution begins. After being heated at 120° C. for 5.5 hours, the viscous solution is poured into methanol to precipitate the polymer. The polymer is washed and dried; $\eta$inh = 0.72 (I). The polymer is redissolved in N,N-dimethylacetamide containing 3 percent by weight lithium chloride to form a 9 percent by weight spinning dope. The dope is extruded into a water bath; useful filaments are produced.

Another polymer sample, prepared in a similar manner, is precipitated, washed, and dried at 70° C. in vacuum; $\eta$inh = 0.73 (I). It is then redissolved at room temperature in N,N-dimethylacetamide containing 3 percent by weight of LiCl to form a spinning dope containing about 10 percent polymer. The dope is extruded under a pressure of 100 lb./in.$^2$ (7.03 kg./cm.$^2$) through a 60-hole spinneret, each hole of 0.002 inch (0.005 cm.) diameter, into a water bath maintained at 50° C. The resulting yarn is wound up at 105 ft./min. (32 m./min.), washed with water, and dried in vacuum at 70° C. A portion of the lustrous, as-extruded yarn is hand drawn 1.7X over a hot bar maintained at 210° C. to produce filaments with the following physical properties: T/E/Mi/Den.: 2/5.8/56/2.8.

EXAMPLE 4

This example illustrates the preparation of a PACM-CS$_2$ salt which is isolated and converted into poly(4,4'-methylenedicyclohexylenethiourea).

To a solution of PACM (108.6 g., 0.52 mole, 70% tt) dissolved in N,N-dimethylacetamide (800 ml.) is added, under nitrogen, a solution of $CS_2$ (42 ml., 0.7 mole) in N,N-dimethylacetamide (100 ml.). The resulting viscous solution is stirred overnight at ambient temperature, after which it is combined with methanol to precipitate the above-identified salt. The white, crystalline salt is collected by filtration, washed with methanol and dried in a vacuum oven at 60° C.; yield is 136 g.

A reaction mixture is prepared (under nitrogen) by combining the above-prepared PACM-CS$_2$ salt (16 g.) pyridine (185 ml.), LiCl (6 g.), and a catalytic amount of iodine. The continuously stirred reaction mixture is heated at 100° C. (oil bath), under nitrogen for 20 hr.; hydrogen sulfide is evolved. The bath temperature is then raised to 130°–140° C. and stirring continued. After 4 hr. the evolution of hydrogen sulfide decreases significantly and a viscous reaction mixture is obtained. The polymer is precipitated, washed, and dried to yield 12 g. of product; $\eta$inh = 0.94 (I).

EXAMPLE 5

This example illustrates the preparation of poly (4,4'-methylenedicyclohexylenethiourea) in dimethylsulfoxide and the preparation of fibers therefrom.

In a 250 ml., 3-necked flask equipped with a stirrer, gas inlet and outlet tubes, and a reflux condenser are placed PACM (7 g., 0.033 mole, 70% tt), $CS_2$ (2 ml., 2.5 g., 0.033 mole), dimethylsulfoxide (100 ml.), and pyridine (2.66 ml., 0.033 mole). The reaction mixture is stirred and heated at 100° C. overnight under a slow stream of nitrogen, after which it is allowed to stand at room temperature for 24 hr. The reaction mixture is poured into water to precipitate the polymer which is collected, washed 3 times with water and once with acetone, and dried to yield 7 g. of polymer; $\eta$inh = 1.43 (I).

A sample of the above-prepared polythiourea (5 g.) is dissolved in hexamethylphosphoramide (50 ml.) to form a spinning solution. To a portion of this solution is added LiCl (1.5 g.) and the resulting spin dope is extruded through a 20-hole spinneret, each hole of 0.002 inch (0.005 cm.) diameter into a water bath maintained at room temperature. The resulting filaments are wound up at 26 ft./min. (7.9 m./min.) washed, and dried. They exhibit the following tensile properties: T/E/Mi/Den.: 1.7/57.6/34.6/2.7.

EXAMPLE 6

This example illustrates the preparation of poly (4,4'-methylenedicyclohexylenethiourea) in a mixed solvent system and the preparation of fibers therefrom by dry spinning.

A reaction mixture comprising PACM (15 g., 0.071 mole, 70% tt), di(4-isothiocyanatocyclohexyl)methane (21 g., 0.071 mole), LiCl (11.6 g.), and 400 ml. of a mixture of pyridine/N,N-dimethylacetamide (80.20, V/V) is stirred overnight at ambient temperature, after which an additional 2 g. of di(4-isothiocyanatocyclohexyl)methane are added. A sample of the polymer isolated from the viscous dope exhibits an inherent viscosity of 1.1 (II).

The above-prepared dope, maintained at a temperature of 75°–76 C., is extruded through a 17-hole spinneret, each hole of 0.005 inch (0.0127 cm.) diameter, into a drying column maintained between about 116°–128° C. and which is swept with a co-current stream of nitrogen (5.5 ft.³/min., 0.156 m³/min.) which enters the column at about 120° C. The resultant yarn is wound up at the rate of 102 yd./min. (9.32 m./min.) and a finish applied thereto. The yarn is extracted in water and dried. The lustrous yarn is then drawn 2.1X at 245° C. over a hot plate to produce filaments which exhibit the following physical properties: T/E/Mi/Den.: 3.6/6.6/84/2.05.

EXAMPLE 7

This example illustrates the preparation of high viscosity poly(4,4'-methylenedicyclohexylenethiourea) and the preparation of fibers therefrom.

To a stirred solution of PACM (14 g., 0.067 mole, 98.9% tt) in a mixture of hexamethylphosphoramide (200 ml.) and pyridine (5.6 ml.), under nitrogen, is added $CS_2$ (4.42 ml., 0.074 mole). The solution is stirred for 5 minutes at autogenous temperature, after which the reaction vessel is immersed in an oil bath at 99° C.; 4.25 hr. after immersion the oil bath temperature reaches 109° C.; 28 hr. after immersion the bath temperature reaches 118° C. The reaction mixture is cooled and permitted to stand at room temperature for 1-2 days. It is then poured into water to precipitate the polymer which is collected, washed in a blender with water (5X) and with acetone (2X) and dried at 100° C. in a vacuum oven; yield is 16.4 g., $\eta$inh = 4.2 (II). A repetition of this synthesis (initial oil bath temperature = 104° C.; temperature reaches 113° C. four hrs. after immersion and 111° C. at about 28 hrs. after immersion, whereupon the reaction is cooled and stands 1-2 days at room temperature before polymer isolation, as above) yields 16.5 g. of polymer; $\eta$inh = 4.16 (II).

A spinning solution is prepared by first combining 15.6 g. of the first sample and 14.4 g. of the second sample, above, with 422 ml. of a mixture of N,N-dimethylacetamide/LiCl (97/3, wt./wt.), with stirring; 68 ml. of the solvent mixture is then added to produce a spinning solution containing 6 percent by weight of the polythiourea. A portion of this solution is extruded through a 100-hole spinneret, each hole of 0.0025 inch (0.006 cm.) diameter, into a water bath maintained between about 72°–76° C. The resulting yarn is wound up at 35.5 ft./min. (10.8 m./min.), extracted about 2 days in distilled water, and dried in a vacuum oven at 100° C. Filament tensile properties are: T/E/Mi/Den.: 3.4/17.2/51.2/1.75. After a sample of this yarn is drawn 1.35X, under nitrogen, in a 33 inch (0.82 meter) hot tube whose center portion is maintained at 312° C., the following filament properties are observed: T/E/Mi/Den.: 5.3/5.9/86/1.26.

EXAMPLE 8

This example demonstrates that fibers of this invention exhibit high recovery and stability to degradation by ultraviolet light and by dilute HCl and NaOH solutions, as well as excellent hot-wet tensile properties.

To a stirred solution of PACM (109.1 g., 0.52 mole, 94% tt) in 1.5 l. of N,N-dimethylacetamide is added, under nitrogen, bis(p-isothiocyanatocyclohexyl)methane (152.7 g., 0.52 mole, 94% tt). Complete solution occurs within 3 minutes and the temperature of the reaction mixture rises to 50° C. A solution of LiCl (50 g.) in N,N-dimethylacetamide (500 ml.) is then added, followed by an additional 1,600 ml. of N,N-dimethylacetamide. The reaction mixture is stirred overnight at room temperature to form a spinning solution containing about 7.7 percent polymer (by weight) and 1.5% LiCl (by weight). This solution is extruded into fibers by wet spinning; several bobbins of yarn are collected, washed, and dried. A sample of the yarn exhibits an inherent viscosity of 1.59 (II). The filaments exhibit the following tensile properties: T/E/Mi/Den.: 2.3/85/30/11.7; $WR_3/TR_3$ = 63/88. After samples of the yarn are drawn while being passed at an input speed of 25 ft./min. (7.6 m./in.) through a nitrogen-filled tube whose center temperature is 290°, the filaments exhibit the following tensile properties after being subjected to the drawing conditions indicated in Table A:

TABLE A

| Fiber Sample | Draw | T | E | Mi | Den |
| --- | --- | --- | --- | --- | --- |
| 1–A | 1.5X | 3.25 | 5.8 | 56 | 4.3 |
| 2–A | 1.6X | 4.2 | 6.1 | 87 | 4.1 |
| 3–A | 1.7X | 3.9 | 5.3 | 92 | 4.2 |
| 4–A | 1.8X | 3.8 | 5.3 | 90 | 4.2 |

After the sample of the as-extruded yarn, above, is subjected to a 2-stage drawing [1.1X at room temperature and 1.5X at 290° C. (nitrogen filled tube, 1 ft. (30.5 cm.) in length, internal center portion at 290° C., yarn input speed is 10 ft./min., 3.05 m./min.)], the following filament properties are observed: T/E/Mi/Den/.: 4.2/5.6/83/6.7; $WR_3/TR_3$ = 83/95.

The excellent retention of tensile properties by the fibers of this invention after exposure to acidic and basic reagents is shown below in Table B. Separate portions of Fiber Sample 2–A, whose properties are shown above in Table A, are immersed in refluxing, aqueous 10% HCl and 10% NaOH solutions for 1 and 2 hr.; tensile properties of the treated filaments are shown in Table B, below.

TABLE B

| Sample | Hr. in HCl | hr. in NaOH | T | E | Mi | % Original T Retained |
|---|---|---|---|---|---|---|
| 1–B | 1 | – | 2.6 | 4.6 | 82 | 62 |
| 2–B | 2 | – | 2.2 | 3.9 | 78 | 52 |
| 3–B | – | 1 | 3.6 | 6.4 | 75 | 86 |
| 4–B | – | 2 | 3.0 | 5.5 | 78 | 72 |

Another portion of Fiber Sample 2–A (from Table A) is exposed to light in an Atlas Weather-Ometer (Model 600–WR). The results of this test, shown below in Table C, illustrate that the fibers of this invention exhibit excellent resistance to degradation by ultraviolet light.

TABLE C

| Sample | Exposure Hours In Weather-Ometer | T | E | Mi |
|---|---|---|---|---|
| 2–A | unexposed | 4.2 | 6.1 | 87 |
| 1–C | 100 | 2.63 | 4.0 | 83 |
| 2–C | 500 | 1.56 | 1.8 | 83 |

Presented below in Table D is a summary of the wet and hot-wet tensile properties exhibited by the filaments of Fiber Sample 3–A of Table A, above. The data demonstrate an excellent retention of fiber properties, particularly $WR_3$ and $TR_3$, under the test conditions.

TABLE D

| Fiber Sample | Test Conditions | T | E | Mi | $WR_3$ | $TR_3$ |
|---|---|---|---|---|---|---|
| 3–A | Dry, Room Temp. | 4.2 | 6.7 | 87 | 66 | 88 |
| 1–D | Wet, Room Temp. | 3.1 | 5.0 | 76 | 61 | 86 |
| 2–D | Wet, 90°C. | 2.3 | 4.8 | 66 | 61 | 87 |

EXAMPLE 9

This example illustrates that poly(4,4'-methylenedicyclohexylenethiourea) fibers of this invention exhibit (1) stability to oxidative bleach and (2) a high wash-set recovery angle, both being properties highly desirable for use in each-of-care fabrics.

To a stirred solution of PACM (22.1 g., 0.1 mole, 94% tt) in N,N-dimethylacetamide (200 ml.) is added rapidly bis(p-isothiocyanocyclohexyl)methane (30.9 g., 0.1 mole) suspended in N,N-dimethylacetamide (200 ml.). To the resulting clear solution is added a solution of LiCl (12 g.) in N,N-dimethylacetamide (100 ml.). The reaction mixture is then stirred at ambient temperature for about 3 days to produce a viscous spinning solution containing about 10 percent (by weight) polythiourea and about 2.2 percent (by weight) of LiCl. This solution is extruded at room temperature through a 100-hole spinneret, each hole of 0.003 inch (0.008 cm.) diameter, into a water bath maintained at about 60°–70° C. The resulting yarn is collected at 25 ft./min. (7.6 m./min.), washed overnight in cold water, and dried in air. After a portion of the yarn is drawn 1.3X at 235° C., the following filament tensile properties are observed: T/E/Mi/Den.: 2.6/12.6/62/3.4; $TR_3/WR_3/TSR_3$ =94/67/51; $\eta$inh = 0.74 (I); WSRA = 305°. A portion of the drawn yarn is then immersed in a 2.5 percent "Chlorox" solution at 70° C. for 4 hr., after which it is washed well with water and dried in air overnight. The following filament tensile properties are then observed (no detectable yellowing of the sample): T/E/Mi: 1.4/8.0/51.

A similarly prepared solution of the above-named polythiourea (6.9 percent polymer, 1.15% LiCl; wt. basis) is wet spun into fibers [$\eta$inh = 1.4 (I)] which, after being washed and dried, are drawn 1.4X at 275° C. to produce filaments with the following properties: T/E/Mi/Den.: 4.4/6.2/84/3.2; $WR_3/TR_3$ = 67/87. For these filaments, WSRA = 335°.

EXAMPLE 10

This example illustrates the preparation of a copolythiourea of this invention from 1,4-diaminocyclohexane and PACM. The copolymer comprises repeating units corresponding to the formula

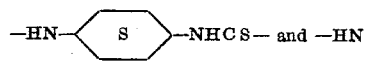—NHCS— and —HN

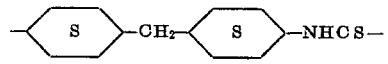—NHCS— in the relative ratio (mole basis) of 65/35; fibers are prepared.

A reaction mixture comprising 1,4-diaminocyclohexane (3.5 g., 0.031 mole), PACM (3.5 g., 0.017 mole, 70% tt), hexamethylphosphoramide (100 ml.), and $CS_2$ (3.3 ml., 0.054 mole) is stirred and heated at 100° C. overnight (i.e., about 16–20 hr.) under nitrogen. Additional hexamethylphosphoramide (100 ml.) and LiCl (6 g., 0.06 mole) are added, after which the reaction mixture is cooled to room temperature. A portion of the reaction mixture is then extruded through a 20-hole spinneret, each hole of 0.002 inch (0.005 cm.) diameter, into a water bath maintained at room temperature. The resulting filaments are wound up at 36 ft./min. (11 m./min.), washed in water overnight, and dried. Filament properties are: T/E/Mi/Den.: 2.44/41.9/48.7/2.1. The remainder of the reaction mixture is combined with water to precipitate the polymer which is collected, washed with water (2X) and acetone (1X), and dried to constant weight in a vacuum oven of 100° C.; yield is 5.9 g., $\eta$inh = 3.52 (II).

Presented below in Table E is a summary of the reaction conditions and results of syntheses of other copolymers of this invention. These syntheses are performed as in Example 10, above, except as noted in the Table (ie.g., "Same" = conditions of Example (i.e., In the Table, "solvent" signifies hexamethylphosphoramide and the meanings of diamines "A," "B," and "C" are explained in the Legend. All values of copolymer $\eta$inh are determined in m-cresol (i.e., "I"), except as noted. The column entitled "Shaped Article" appropriately indicates that a film and/or fiber is prepared from the particular species by procedures similar or equivalent to those shown in other examples herein.

What is claimed is:

1. A linear, high-molecular weight polythiourea having an inherent viscosity of at least about 0.5 and wherein at least 35 mole percent of the repeating units of said polythiourea are of the formula:

(I) 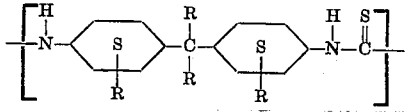

wherein each R is individually selected from the group consisting of hydrogen and methyl, any copolymeric repeating units present being of the formula:

(II) $-N-(Z')_a-(Z'')_b-(Z''')_c-N-C-$ 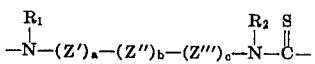

wherein:
Z', Z'' and Z''' are individually selected from the group consisting of divalent alicyclic hydrocarbyl radicals of six carbon atoms which may bear up to 2 chloro and/or methyl substituents per ring and divalent saturated aliphatic hydrocarbyl radicals of one to six carbon atoms which may bear chloro substituents,
$a$, $b$ and $c$ are integers individually selected from the group consisting of 0 to 1, at least one of said integers being 1, with the proviso that $-(Z')_a-(Z'')_b-(Z''')_c-$ contain four to 20 carbon atoms, and $R_1$ and $R_2$ are individually selected from the group consisting of hydrogen and lower alkyl,
and being joined into the linear polymer chain as an integral part thereof.

2. Polythiourea of claim 1 consisting essentially of repeating units of said formula (I).

3. Polythiourea of claim 1 containing at least about 75 mole percent of repeating units of said formula (I).

4. Polythiourea of claim 1 wherein said divalent radicals are predominantly alicyclic.

5. Polythiourea of claim 1 wherein at least 30 weight percent of the diiminohydrocarbon moiety of said formula (I) is in the trans-trans stereoisomeric configuration.

6. Shaped article of the polythiourea of claim 1.

7. Fiber of the polythiourea of claim 1.

* * * * *